United States Patent
Cho

Patent Number: 6,032,918
Date of Patent: Mar. 7, 2000

[54] MULTI-FUNCTIONAL DEVICE FOR A DISPLAY DEVICE

[75] Inventor: Chang-Ho Cho, Incheon-si, Rep. of Korea

[73] Assignee: SamSung Electronics Co., Ltd., Kyungki-do, Rep. of Korea

[21] Appl. No.: 08/965,645

[22] Filed: Nov. 6, 1997

[30] Foreign Application Priority Data

Nov. 6, 1996 [KR] Rep. of Korea ............ 96-52397

[51] Int. Cl.[7] .......... A47G 29/00; A47B 91/60; A47B 95/00
[52] U.S. Cl. .......... 248/923; 248/346.06; 248/349.1; 361/682; 361/686
[58] Field of Search .......... 248/688, 346.03, 248/346.06, 349.1, 910, 917, 918, 919, 920, 921, 922, 923, 183.2, 398; 312/351.2; 345/905, 903; 361/681, 682, 683, 686

[56] References Cited

U.S. PATENT DOCUMENTS

| | | | |
|---|---|---|---|
| 3,936,026 | 2/1976 | Hampel et al. | 248/922 |
| 4,310,136 | 1/1982 | Mooney | 248/278 |
| 4,365,779 | 12/1982 | Bates et al. | 248/371 |
| 4,395,010 | 7/1983 | Helgeland et al. | 248/371 |
| 4,437,638 | 3/1984 | Scheibenpflug | 248/282 |
| 4,483,503 | 11/1984 | Gahan | 248/349 |
| 4,547,027 | 10/1985 | Scheilbenreif | 339/8 R |
| 4,566,663 | 1/1986 | Barchus | 248/324 |
| 4,589,713 | 5/1986 | Pfuhl et al. | 339/7 |
| 4,624,434 | 11/1986 | Lake, Jr. et al. | 248/454 |
| 4,645,153 | 2/1987 | Granzow et al. | 248/178 |
| 4,781,347 | 11/1988 | Dickie | 248/183 |
| 4,781,422 | 11/1988 | Kimble | 312/72 |
| 5,081,742 | 1/1992 | Kobayashi | 16/337 |
| 5,088,680 | 2/1992 | Farmer | 248/910 |
| 5,100,098 | 3/1992 | Hawkins | 248/917 |
| 5,247,285 | 9/1993 | Yokota et al. | 248/919 |
| 5,335,142 | 8/1994 | Anderson | 361/681 |
| 5,455,746 | 10/1995 | Sato et al. | 361/816 |
| 5,569,895 | 10/1996 | Lynch et al. | 248/923 |
| 5,587,876 | 12/1996 | O'Brien et al. | 361/682 |
| 5,588,625 | 12/1996 | Beak | 248/923 |
| 5,590,021 | 12/1996 | Register | 248/923 |
| 5,604,663 | 2/1997 | Shin et al. | 361/686 |
| 5,632,463 | 5/1997 | Sung et al. | 248/349.1 |
| 5,646,818 | 7/1997 | Hahn | 248/917 |
| 5,666,694 | 9/1997 | Slow et al. | 16/368 |
| 5,701,347 | 12/1997 | Daniels et al. | 381/24 |
| 5,729,430 | 3/1998 | Johnson | 361/682 |
| 5,732,922 | 3/1998 | Jeon | 248/371 |
| 5,786,983 | 7/1998 | Brenner et al. | 361/680 |

*Primary Examiner*—Derek J. Berger
*Assistant Examiner*—Michael Nornberg
*Attorney, Agent, or Firm*—Robert E. Bushnell, Esq.

[57] ABSTRACT

An improved multi-functional stand that uses a swivel device and a hinge to allow a display unit to be adjusted in any angle relative to the stand. The stand has a speaker and has connections on a rear portion of the stand housing for both a power cable and a plurality of signal cables. The cables are connected to an interface circuit board and the power and image signals are then transferred to the main circuit board through a cable that runs through the stand and is inserted into the display device.

24 Claims, 4 Drawing Sheets

MULTI-FUNCTIONAL DEVICE FOR A DISPLAY DEVICE

CLAIM OF PRIORITY

This application makes reference to, incorporates the same herein, and claims all benefits accruing under 35 U.S.C. §119 from my application entitled Flat-panel Display Device Having Variable Stand Unit earlier filed in the Korean Industrial Property Office on the 6th day of November 1996, and there duly assigned Serial No. 96-52397 by that Office.

BACKGROUND OF THE INVENTION

1. Field of the Invention

The present invention relates to a flat-panel display device and, more particularly, to a flat-panel display device having a stand that has a connector for supplying electrical power and video signals to a liquid crystal display (LCD).

2. Background Art

Monitors consist of a stand and an outer housing, composed of a front and rear portion, that contains a display unit. Display unit can be of either a cathode ray tube (CRT) or a liquid crystal display (LCD) type. Typically, power and signal cables are extended from the back of the display unit in a direction perpendicular to the plane of face of the display unit. The development of new LCD panels has encouraged research directed towards improving both display units and supporting stands. Contemporary display units are shown, for example, in U.S. Pat. No. 5,632,463 to Sung et al. entitled Monitor Stand Assembly, U.S. Pat. No. 5,588,625 to Beak entitled Monitor Stand Assembly, U.S. Pat. No. 5,335,142 to Anderson entitled Portable Computer Display Tilt/Swivel Mechanism, U.S. Pat. No. 4,645,153 to Granzow et al. entitled Tilt and Swivel Support, U.S. Pat. No. 4,589,713 to Pfuhl et al. entitled Video Display Support Joint, U.S. Pat. No. 4,483,503 to Gahan entitled Swivel Mountings, U.S. Pat. No. 4,437,638 to Scheibenpflug entitled Arrangement for Fastening a Monitor to a Test Station, U.S. Pat. No. 4,365,779 to Bates et al. entitled Tilt and Rotate Apparatus for a Display Monitor, and U.S. Pat. No. 4,310,136 to Mooney entitled Backlash-Free Swivel and Tilt Mounting.

However, I have observed that with the increasing ability of display units to accommodate and display greater amounts of data the number of connectors attached to the display unit has increased. These connectors and attached cables protrude from the display unit and require that the monitors be spaced away from a wall if a user is to effectively rotate them. I have further observed that the rotation of the display unit with the attached signal cables subjects the connectors on the display unit to increased stress. This stress weakens the connectors and lowers the lifespan of the monitor. This results in a reduction in the reliability of the monitors and a corresponding reduction in the monitor's market competitiveness. I expect that a stand that allows a display unit to connect to signal cables without impeding rotation will increase the functionality of the monitor and that a display unit that does not stress its connectors will be more competitive due to a longer lifespan.

SUMMARY OF THE INVENTION

Accordingly it is an object of the present invention to provide an improved multi-functional stand for a display device.

It is another object to provide a multi-functional stand that improves the maneuverability of an attached display device.

It is still another object to provide a multi-functional device that reduces the stress on display device connectors.

To achieve these and other objects a flat-panel display device may be constructed using a liquid crystal display unit, a stand that supports the LCD unit. The stand has a connector for supplying input power and video signals received from a computer to the LCD unit. The connector that exists between the stand and the display device transfers the power and the video signal inputs to the LCD unit using an interface circuit. The stand may be constructed using an input cover, for covering the cable connectors while providing access for the power and video signal connectors and cables.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

Figure 1A:
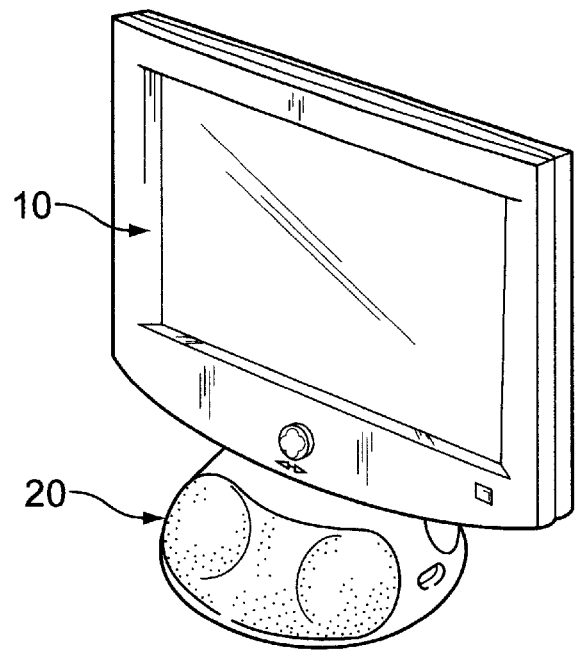
FIG. 1A is a perspective view of a flat-panel display device as constructed according to the principles of the present invention.
Figure 1B:
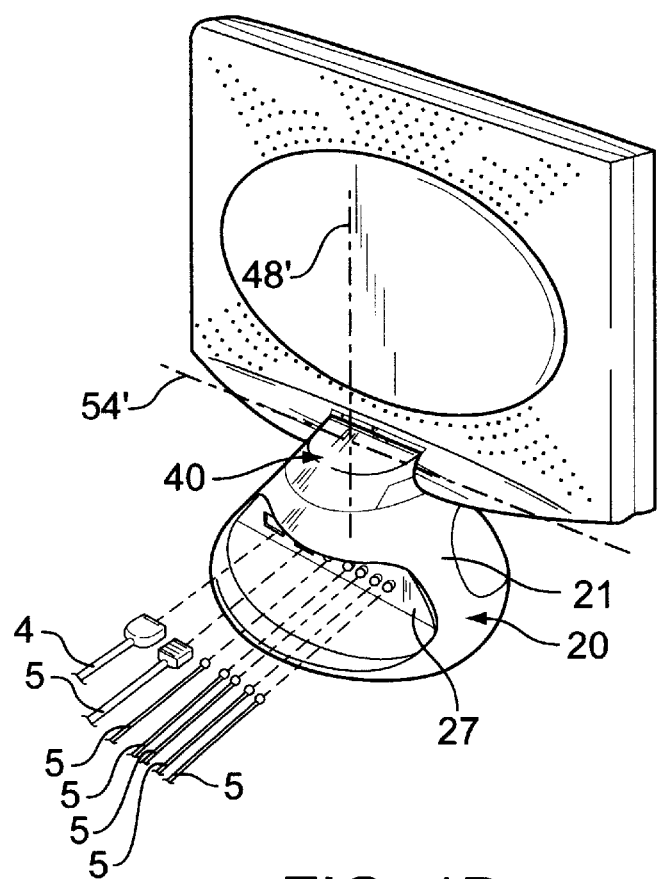
FIG. 1B is a perspective view of the display device of FIG. 1A.

As shown in FIGS. 1A and 1B, a flat-panel display device as constructed according to the principles of the present invention may be constructed using display unit 10, that has a liquid crystal panel on which images are displayed; stand unit 20 that supports display unit 10; and hinge unit 40, that connects display unit 10 to stand unit and allows the angle between the screen and the stand to be adjusted. This allows the unhindered adjustment of the display unit. Thus, the viewing angle of display unit 10 with respect to stand unit 20 can be adjusted to conform with the user's desires.

Figure 2:
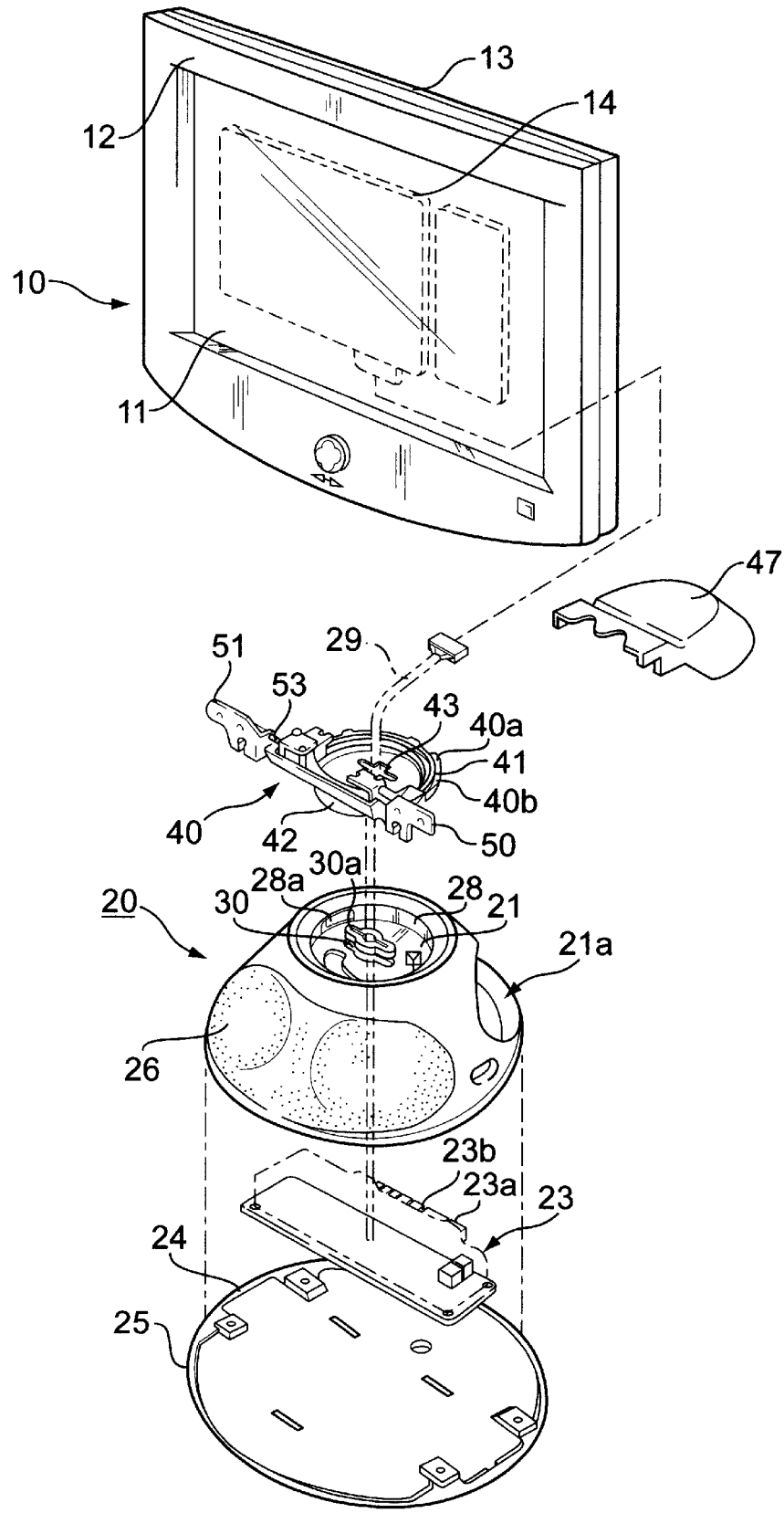
FIG. 2 is an exploded view of the display device of FIG. 1A.
Figure 3:
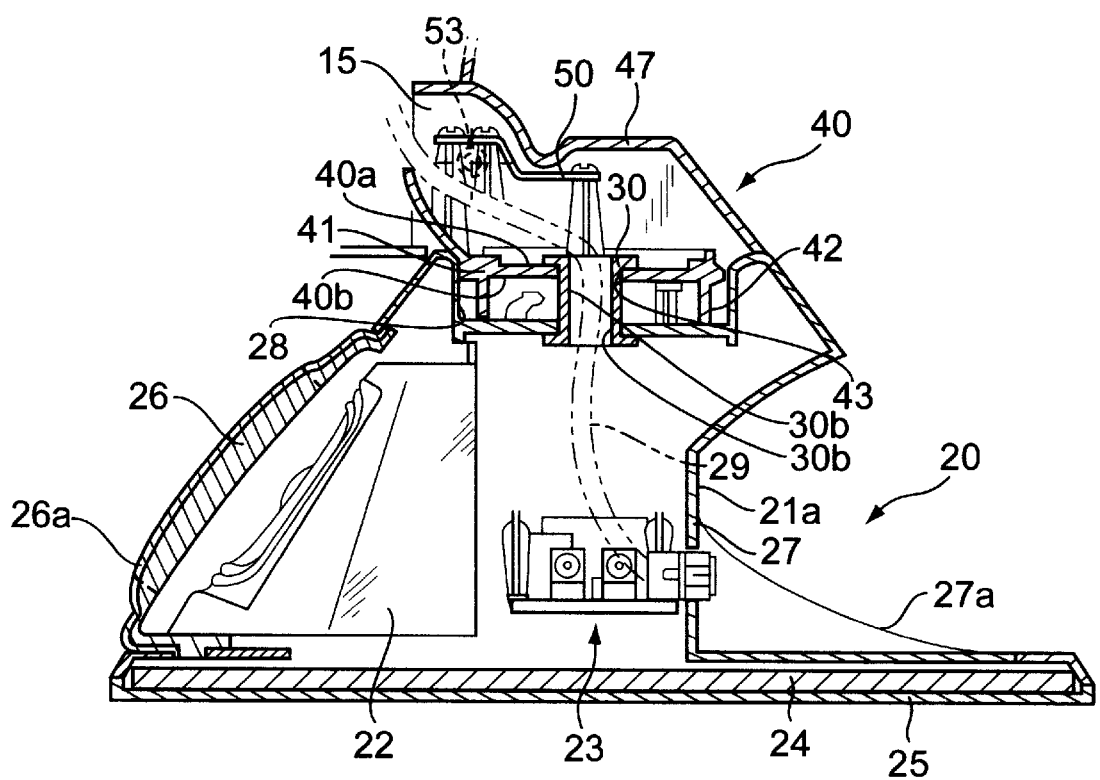
FIG. 3 is a cross-sectional side view of the display device of FIG. 1A.
Figure 4:
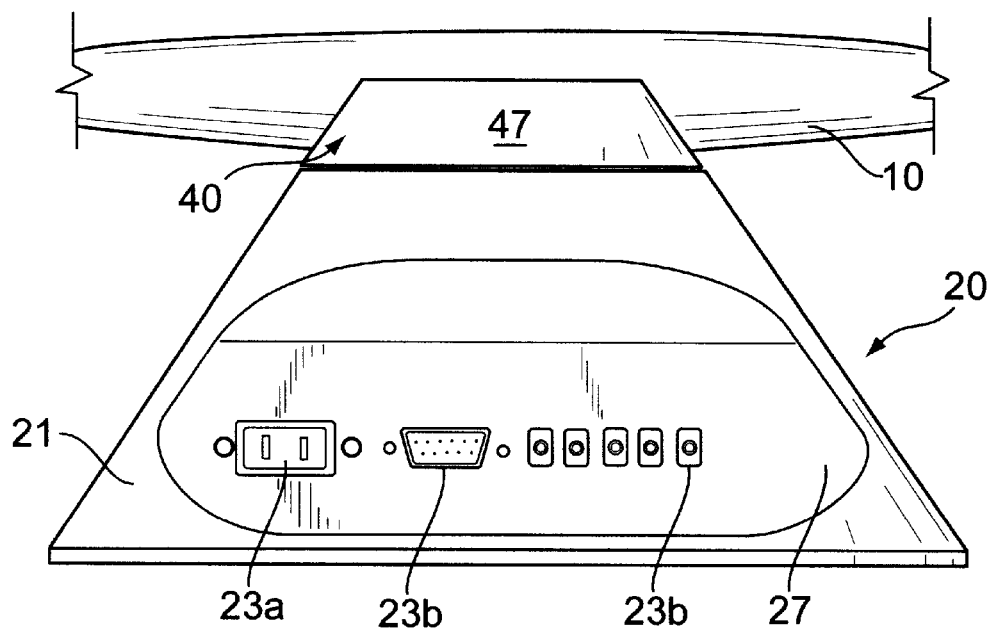
FIG. 4 is a rear view of the stand that supports the display device of FIG. 1A.

FIGS. 2–4 show a monitor that is constructed using LCD panel 11, front and rear housings 12 and 13 that contain LCD panel 11, and main circuit board 14 that is installed between the housings. Stand unit 20 has both speaker unit 22 and interface circuit board 23 installed in stand 21. The stand has bottom cover, also referred to as a base 25 that has an attached weight 24. Speaker unit 22 is covered first by speaker cover 26 and then by dust cover 26a. Interface circuit board 23 is installed inside stand 21 and receives display control signals and electrical power from signal cables 5 and power cable 4 shown in FIG. 3B. Input cover 27 is located on the rear portion of stand body 21. The input cover has a plurality of apertures for mounting power connector 23a and connectors 23b that mate with power cable 4 and signal cables 5, respectively.

Hinge unit, also referred to as an interface device 40 is constructed a hinge body 41 that has lip 42 on the lower portion of the hinge body for guiding hinge body 41 during rotation inside of stand 21. The interface device has a first surface, or bottom side, 40b and a second surface, or top side, 40a. Lip 42 is inserted into recess 28 in the stand unit. Recess 28 serves as a guide for lip 42, thus allowing a swiveling motion during the rotation of the hinge body on stand 21. Aperture 43, also referred to as a perforation, positioned along the hinge axis is located in the center of hinge body 41. Hollow shaft 30, also referred to as a boss, is positioned in the center of recess 28 in stand body 21 and engages hinge body 41 by being inserted through aperture 43. Along an inner surface of recess 88 are semi-circumferential ribs 28a. When hollow shaft 30 is mated to the hinge body and protruding through aperture 43 and rotated, winged projections, also referred to as diametrically opposed projections or at least one projection, 30a and secure the hinge body to stand 21. Thus, the multi-functional stand allows the display device to swivel while preventing the disconnection of the hinge body from the stand. The hinge body and the recess can each have an attached beam that function as stops to prevent rotation past a certain desired angular amount. Also the hinge body can have a circumferential lip 42 around its outer surface that is matable with a circumferential seating recess formed around recess 28. This combination lip and seating surface further distributes eccentric forces due to the position of the display unit along the stand.

Furthermore, hinge body 41 has horizontal shaft 53 attached on a side opposite the stand. Shaft 53 has two attached brackets, also referred to as a connector 50 and 51 that combine with shaft 53 to form a pivoting element about a horizontal axis. The pivoting element is attached to display unit 10, thus securing the display unit to hinge body 41. The pivoting element allows the display unit to be tilted forward or backward with respect to the horizontal axis defined by horizontal shaft 53. Hinge cover 47 entirely covers hinge body 41.

Control signals and electrical power are transferred to main circuit board 14 from interface circuit board 23 by cable 29. Cable 29 is connected to the interface circuit board and runs through aperture, also referred to as a duct 30b in hollow shaft 30 to connect with main circuit board 14. Cable 29 is connected to main circuit board 14 using internal passageway 15 that is located in the lower portion of display unit 10 and concealed by hinge cover 47, or interface device, 47. A connector cover 27a is attachable over the second recess to conceal the electrical connections 23a and 23b. In addition, either of a headphones connector, or jack, or a microphone connector, or jack, can be built into the stand itself. The jacks can be placed in the second recess 21a or along the side of the stand itself.

This improved multi-functional stand has a stand unit that has power supply connection 23b and the signal supply connection 23a for receiving various inputs. Connections, also referred to as electrical connections 23a and 23b are located on the rear portion of the stand body in second recess 2A and covered by an input cover. Since the signal and power cables 5 and 4 are connected to the stand unit, the display angle between the display unit and the stand can be adjusted without the hindrance of a plurality of cables. This further protects the display device connectors and increases the reliability and lifespan of the display device.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A display device, comprising:
    a housing containing a monitor presenting varying visual images corresponding to video signals;
    an interface device having a first surface and a second surface that are both planar and oriented perpendicular to a center axis of said interface device, said interface device having a perforation along said center axis, a lip protruding below said first surface, and a connector attached along said second surface of said interface device to said housing;
    said connector comprising:
        a shaft attached along said second surface of said hinge unit; and
        a bracket forming a hinge around said shaft;
    said housing attached to and supported by said bracket to rotate about said shaft and swivel about said center axis of said interface device;
    a stand comprising:
        a base;
        said stand having a recess receptively accommodating said interface device to allow rotation of said housing;
        a boss attached to a center of said recess, having a duct, and a projection located at a distal end of said boss, said boss being insertable through said perforation in said interface device;
        a plurality of electrical connectors attached to an outer surface of said stand;
        a cable connected to said plurality of connectors, passing through said duct in said boss and transmitting the video signals to said monitor; and
    said perforation in said interface device accommodating said boss while said interface device is within said recess until said projection protrudes past said perforation, and interface device is able to rotate about said shaft to slidably engage said projection with a side of said interface device to secure said housing to said stand.

2. The display device of claim 1, with said at least one projection having a perforation in a direction perpendicular to said base.

3. The display device of claim 1, with said at least one projection comprised of two diametrically opposed projections.

4. The display device of claim 1, further comprising:
said interface device being rotatable through at least 320 degrees; and
a plurality of semi circumferential ribs attached along an inner surface of said recess providing a retarding force on the rotation of said interface device.

5. The display device of claim 1, further comprised of said stand having a built in microphone connector and a built in headphone connector.

6. The display device of claim 1, further comprised said electrical connectors being on said outer surface of said stand and inside a second recess.

7. The display device of claim 1, further comprised of said stand having at least one speaker built into said stand.

8. The monitor of claim 1, further comprising:
a connector cover attachable to said outer surface of said stand over said electrical connectors; and
a interface device cover attachable on said second surface of said interface device.

9. A display device, comprising:
a housing containing a monitor presenting varying visual images corresponding to video signals;
an interface device having a first surface and a second surface that are both planar and oriented perpendicular to a center axis of said interface device, said interface device having a perforation along said center axis, a lip protruding below said first surface, and a shaft attached along said second surface of said interface device, said shaft having a bracket attached to said housing;
a stand comprising:
a base;
said stand having a recess receptively accommodating said interface device to allow rotation of said housing;
a boss attached to a center of said recess, having a duct, and a projection located at a distal end of said boss, said boss being insertable through said perforation in said interface device;
a plurality of electrical connectors attached to an outer surface of said stand;
a cable connected to said plurality of connectors, passing through said duct in said boss and transmitting the video signals to said monitor; and
said perforation in said interface device accommodating said boss while said interface device is within said recess until said projection protrudes past said perforation, said interface device then rotates about said shaft to slidably engage said projection with a side of said interface device to secure said housing to said stand.

10. The display device of claim 9, with said at least one projection having a perforation in a direction perpendicular to said base.

11. The display device of claim 9, with said at least one projection comprised of two diametrically opposed projections.

12. The display device of claim 9, further comprising:
said interface device being rotatable through at least 320 degrees; and
a plurality of semi circumferential ribs along said inner surface providing a retarding force on the rotation of said interface device.

13. The display device of claim 9, further comprised of said stand having a microphone connector and a headphone connector built in.

14. The display device of claim 9, further comprised said electrical connectors being on said outer surface of said stand and inside a second recess.

15. The display device of claim 9, further comprised of said stand having at least one speaker built into said stand.

16. The display device of claim 9, further comprising:
a connector cover attachable to said outer surface of said electrical connectors; and
a interface device cover attachable on said second surface of said interface device.

17. A display device, comprising:
a housing containing a monitor presenting varying visual images corresponding to video signals;
an interface device having a first surface and a second surface that are both planar and oriented perpendicular to a center axis of said interface device, said interface device having a perforation along said center axis, a lip protruding below said first surface, and a shaft attached along said second surface of said interface device, said shaft having a bracket attached to said housing;
a stand comprising:
a base;
a recess receptively accommodating said interface device to allow rotation of said housing;
a boss attached to a center of said recess, having a duct, and a projection located at a distal end of said boss, said boss being insertable through said perforation in said interface device;
a plurality of electrical connectors attached to an outer surface of said stand;
a cable connected to said plurality of connectors, passing through said duct in said boss and transmitting the video signals to said monitor; and
said perforation in said interface device accommodating said boss while said interface device is within said recess until said projection protrudes past said perforation, said interface device then rotates about said shaft to slidably engage said projection with a side of said interface device to secure said housing to said stand.

18. The display device of claim 17, with said at least one projection having a perforation in a direction perpendicular to said base.

19. The display device of claim 17, with said at least one projection comprised of two diametrically opposed projections.

20. The display device of claim 17, further comprising:
said interface device being rotatable through at least 320 degrees; and
a plurality of semi circumferential ribs attached along an inner surface of said recess providing a retarding force on the rotation of said interface device.

21. The display device of claim 17, further comprised of said stand having both a microphone connector and a headphone connector built in.

22. The display device of claim 17, further comprised of said electrical connectors being mounted on said said stand inside a second recess.

23. The display device of claim 17, further comprising:
a connector cover attachable to said outer surface of said stand over said electrical connectors; and
a interface device cover attachable on said second surface of said interface device.

24. A display device, comprising:

a housing forming a frame having a plurality of sides disposed to embrace a monitor presenting varying visual images corresponding to video signals;

an interface device having a first surface and a second surface oriented perpendicular to a center axis of said interface device, and a connector attached along said second surface of said interface device to said housing;

said connector comprising:
- a shaft attached along said second surface of said interface device; and
- a bracket rotatably attached to said shaft;

a stand having a first and upper extremity forming a base, a second extremity providing a cylindrical recess conformingly shaped to receive and retentively mating with said interface device while accommodating swiveling of said interface device and said connector relative to said base, a body defining an exterior surface extending between said base and said second extremity, and a opening forming edges within said exterior body; and a cover enclosing said opening while retentively engaging said edges;

said housing being attachable to said bracket and rotatable about said shaft while experiencing said swiveling about said center axis of said interface device.

* * * * *